United States Patent
de Queiroz

(10) Patent No.: US 6,778,707 B1
(45) Date of Patent: Aug. 17, 2004

(54) METHOD FOR DECOMPRESSING JPEG FILES USING A VARIABLE BLOCK SIZE INVERSE DISCRETE COSINE TRANSFORM

(75) Inventor: Ricardo L. de Queiroz, Pittsford, NY (US)

(73) Assignee: Xerox Corporation, Stafmford, CT (US)

(*) Notice: Subject to any disclaimer, the term of this patent is extended or adjusted under 35 U.S.C. 154(b) by 0 days.

(21) Appl. No.: 09/466,567

(22) Filed: Dec. 17, 1999

(51) Int. Cl.$^7$ ................................................ G06K 9/36
(52) U.S. Cl. .................... 382/233; 382/248; 382/250; 382/251; 358/426.16; 375/240.18; 375/240.2
(58) Field of Search ......................... 382/232, 233, 382/239, 248, 250, 251, 235, 260; 358/426.02, 426.04, 426.16; 375/240.02, 240.18, 240.2

(56) References Cited

U.S. PATENT DOCUMENTS

| | | | |
|---|---|---|---|
| 5,216,516 A | * | 6/1993 | Tanaka et al. ............... 382/248 |
| 5,371,611 A | | 12/1994 | Kato et al. .................... 358/456 |
| 5,528,299 A | | 6/1996 | Dufour et al. ............... 348/412 |
| 5,576,958 A | * | 11/1996 | Kawakatsu et al. ......... 364/725 |
| 5,642,438 A | | 6/1997 | Babkin ......................... 382/250 |
| 5,699,170 A | | 12/1997 | Yokose et al. ............... 358/426 |
| 5,737,450 A | | 4/1998 | Hajjahmad et al. ......... 382/260 |
| 5,745,251 A | | 4/1998 | Yamagami ................... 358/426 |
| 5,845,015 A | | 12/1998 | Martucci ...................... 382/250 |
| 5,864,637 A | | 1/1999 | Liu et al. ...................... 382/233 |
| 5,867,598 A | | 2/1999 | de Queiroz .................. 382/235 |
| 5,875,039 A | * | 2/1999 | Ohsawa et al. .............. 382/248 |
| 6,377,708 B1 | * | 4/2002 | Shen et al. ................... 382/233 |
| 6,493,466 B1 | * | 12/2002 | Honda et al. ................ 382/236 |

FOREIGN PATENT DOCUMENTS

EP 0 661 886 A2 7/1995

OTHER PUBLICATIONS

I.E.G. Richardson, "Video Codec Design Development Image and Video Compression Systems", John Wiley & Sons, Chichester, 2002, XP–002265087, Chapter 4, pp. 51–56.

"JPEG: Still Image Compression Standard", New York, NY, Van Nostrand Reinhold, 1993 by W. B. Pennebaker and J. L. Mitchell.

* cited by examiner

Primary Examiner—Bhavesh M. Mehta
Assistant Examiner—Ali Bayat
(74) Attorney, Agent, or Firm—Christopher D. Wait

(57) ABSTRACT

A method for decompressing digital image data to improve the speed of decompression is disclosed. More specifically, the present invention improves image decompression time by operating upon a subset of the original data and by performing a modified discrete cosine transform on a subset of the originally provided data. The subset is determined by examining the compressed data and looking for a particular pattern of zero values and/or and "end of block" statement.

27 Claims, 4 Drawing Sheets

METHOD FOR DECOMPRESSING JPEG FILES USING A VARIABLE BLOCK SIZE INVERSE DISCRETE COSINE TRANSFORM

RELATED CASES

Cross reference is made to the following application incorporated by reference herein for its teaching: U.S. Pat. No. 6,167,153, entitled "Method Of Compressing JPEG Files" to Ricardo L. de Queiroz; and U.S. Pat. No. 6,611,626, entitled "Method Of Compressing JPEG Files Using A Conditional Transform" to Ricardo L. de Queiroz.

BACKGROUND OF THE INVENTION AND MATERIAL DISCLOSURE STATEMENT

The transmission of electronic data via facsimile machines and similar devices has become quite common. Efforts to transmit significantly larger volumes of this data within a substantially shortened period of time are constantly being made. This is true not only to allow for data to be sent from one location to another at faster speeds and thereby causing less inconvenience to the user, but to enable more complex data to be transmitted between the same locations without drastically increasing the required processing time. For example the facsimile processing time for a detailed halftoned image will be many times more than that of a simple sheet of black text on a white page when using the same fax machine. By the same token, fax processing of a color image will require an even greater amount of time than its greatly detailed halftoned counterpart.

Without any form of processing reduction, color image data files via facsimile would require extensive resources—very large buffers for one example—and would still take a great deal of processing time, thereby causing receipt of such transmission to become very lengthy and expensive and therefore, impractical. The transmission of color image data via fax is typically accomplished using some form of data compression prior to transmission. The JPEG (Joint Photographic Experts Group) standard provides a well known method of compressing electronic data. JPEG uses the discrete cosine transform (DCT) to map space data into spatial frequency domain data. Simply put, the first step in JPEG compression is to transform an 8×8 block of pixels into a set of 8×8 coefficients using the DCT. In a block, the DCT coefficient with the lowest frequency is referred to as the DC coefficient (DCC), and the remaining coefficients are AC coefficients (ACCs). The DCC and ACCs are quantized—divided by an integer referred to as the "step size" and rounded to the nearest whole number. The losses that occur during JPEG compression typically occur during the quantization step. The magnitude of this loss is obviously dependent upon the step size selected and the resulting amount of round-off required to perform quantization.

Next, the quantized coefficients are arranged in a one dimensional vector by following a selected path (i.e. zigzag) through the 8×8 block of quantized coefficients. The DCC is typically the first value in the vector. Ordinary JPEG compression typically includes replacing the quantized DCC with the difference of its actual value minus the DCC of the previous block, to provide a differential DCC. Finally, the vector is encoded into a bit stream through a sequence of Run Length Counting (RLC) operations, combined with Variable Length Codes (VLC) to produce a compressed data stream.

The "receiving" portion of a fax transmission, after storage of the incoming data in a buffer, applies the inverse of the JPEG operations utilized in the sending portion. First, VLD/RLD decoding operations are performed to decompress the data stream, followed by a inverse DC DPCM operation to recover the DC component of the coefficient matrix. The resulting serial data is then arranged in a 8×8 matrix using the inverse zig-zag pattern. An inverse quantization is then performed. That result is then subjected to an inverse 8×8 discrete cosine transformation to yield the output image. Considerable processing time must be budgeted for the inverse 8×8 discrete cosine transform.

Color image data is complex, so high compression ratios must usually be applied in order to complete the transmission within an acceptable time frame. High compression ratios lead to more data loss, which typically occurs at the higher end of the frequency range. Further, the imaging devices typically included with fax machines in the lower end of the market usually include thermal ink-jet printers and would likely use error diffusion halftoning techniques. The halftoning that occurs when using a thermal ink jet printer results in an additional loss of high frequency data. Thus, much of the detail in the original image that is preserved and transmitted will never actually be viewed by the ultimate user.

With this in mind, successful fax transmission requires a proper correspondence between the decompression operation being applied to the image data and the clock speed of CPU of the receiving fax. In other words, if the decompression operation requires to much processing for a given CPU speed the data will have to wait for reception, and an appropriately sized buffer will be required. This will also frustrate the human operator if it delays the printing of a color fax too much and if the phone line wait times become to long because of buffer overflow, the transmission will be terminated. Thus, it is advantageous to reduce processing time at the receiving fax. One way to do this is obviously to implement a faster CPU to keep the data moving through the modem. Further, a larger buffer may be provided to avoid wait time in the phone line transmission. However, these solutions result in significant cost increases and may even be impractical. Thus, it is most advantageous to shorten the computational processing time of a color facsimile by implementing a faster data decompression without having to resort to the purchase of more expensive equipment.

The following disclosures may be relevant to aspects of the present invention:

U.S. Pat. No. 5,737,450 to Hajjahmad et al. issued Apr. 7, 1998 discloses a method and apparatus for applying an image filter to an image signal where image data terms, corresponding to the image signal, are converted by means of an overlapping operation and a scaled forward orthogonal transformation to form frequency coefficient matrices, the image filter is converted by means of a descaled orthogonal transformation to form a descaled frequency filter matrix, and the frequency coefficient matrices are multiplied by the descaled frequency filter matrix to form filtered coefficient matrices for conversion into a filtered image signal by means of an inverse orthogonal transformation process.

U.S. Pat. No. 5,699,170 to Yokose et al. issued Dec. 16, 1997, discloses an image communication system wherein transmission of an image between an image transmission apparatus and an image reception apparatus which include image output sections having different performances can be performed without making an inquiry for the performance prior to transmission is disclosed. An image is inputted by an image input section and sent to a hierarchization section in the image transmission apparatus. The hierarchization section converts the inputted image into hierarchic communication data and transmits hierarchized data to a selection section of the image reception apparatus. The selection section extracts only necessary data from the hierarchic communication data transmitted thereto in accordance with the performance of an image output section of the image reception section and then sends the necessary data to the image output section after, if necessary, they are converted into image data. The image output section visualize the image data transmitted thereto from the selection section.

U.S. Pat. No. 5,642,438 to Babkin issued Jun. 24, 1997 discloses image compression implementing a fast two-dimensional discrete cosine transform. More specifically, Babkin discloses a method and apparatus for the realization of two-dimensional discrete cosine transform (DCT) for an 8×8 image fragment with three levels of approximation of DCT coefficients. "JPEG: Still Image Compression Standard", New York, N.Y., Van Nostrand Reinhold, 1993 by W. B. Pennebaker and J. L. Mitchell.

All of the references cited herein are incorporated by reference in their entirety for their teachings.

Accordingly, although known apparatus and processes are suitable for their intended purposes, a need remains for image decompression via a fast JPEG compressor using a variable block-size inverse discrete cosine transform to decompress digital image data and shorten processing time, thereby improving the efficiency of the serial data transmission.

SUMMARY OF THE INVENTION

The present invention relates to a method of improving the speed and efficiency of electronic data decompression. This method comprises retrieving compressed serial data corresponding to a matrix. Then applying a transform to a subset of the compressed serial data to produce a subset transform result. Finally interpolation of the subset transform result is performed to provide decompressed data.

In accordance with another aspect of the invention there is provided a method of improving the speed and efficiency of electronic data decompression. This method comprises examining compressed serial data for particular arrangements of data. Then determining a subset of the compressed data depending upon the particular arrangement of data found in the examining step. This is followed by applying a transform to the subset of the compressed data to produce a subset transform result. Finally interpolation of the subset transform result is performed to provide decompressed data.

In accordance with yet another aspect of the invention there is provided a method of improving the speed and efficiency of JPEG decompression. This method comprises examining compressed serial data for particular arrangements of data to determine a determined subset of compressed data. Then applying a transform to the determined subset of compressed data to produce a subset transform result. Finally, interpolation of the subset transform result is performed to provide a full 8×8 matrix of pixel data.

BRIEF DESCRIPTION OF THE DRAWINGS

Other features and advantages of the present invention will become apparent as the following description proceeds and upon reference to the drawings, in which:

Figure 3:
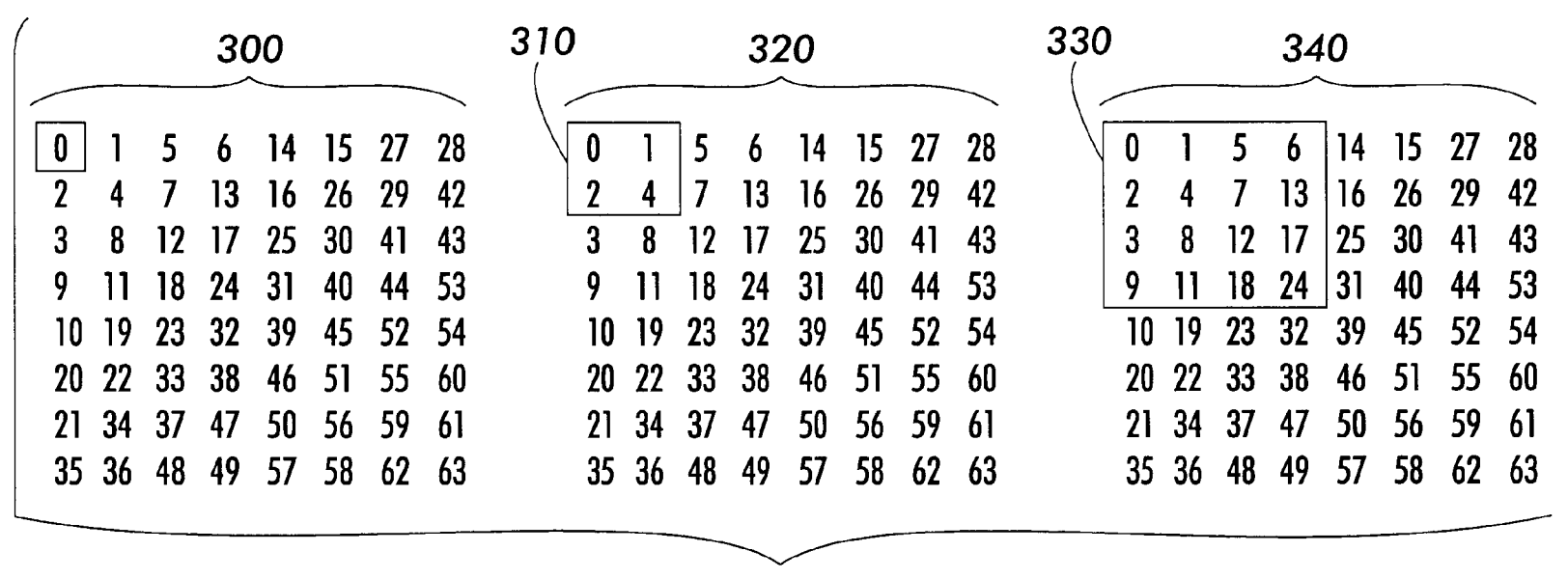

FIG. 3 is a illustration of three 8×8 matrices showing 1×1, 2×2, and 4×4, operational blocks.

DETAILED DESCRIPTION OF THE PREFERRED EMBODIMENT

The present invention is directed to a method and apparatus for decompressing complex digital image data to enhance the efficiency of data transmission.

Figure 1:
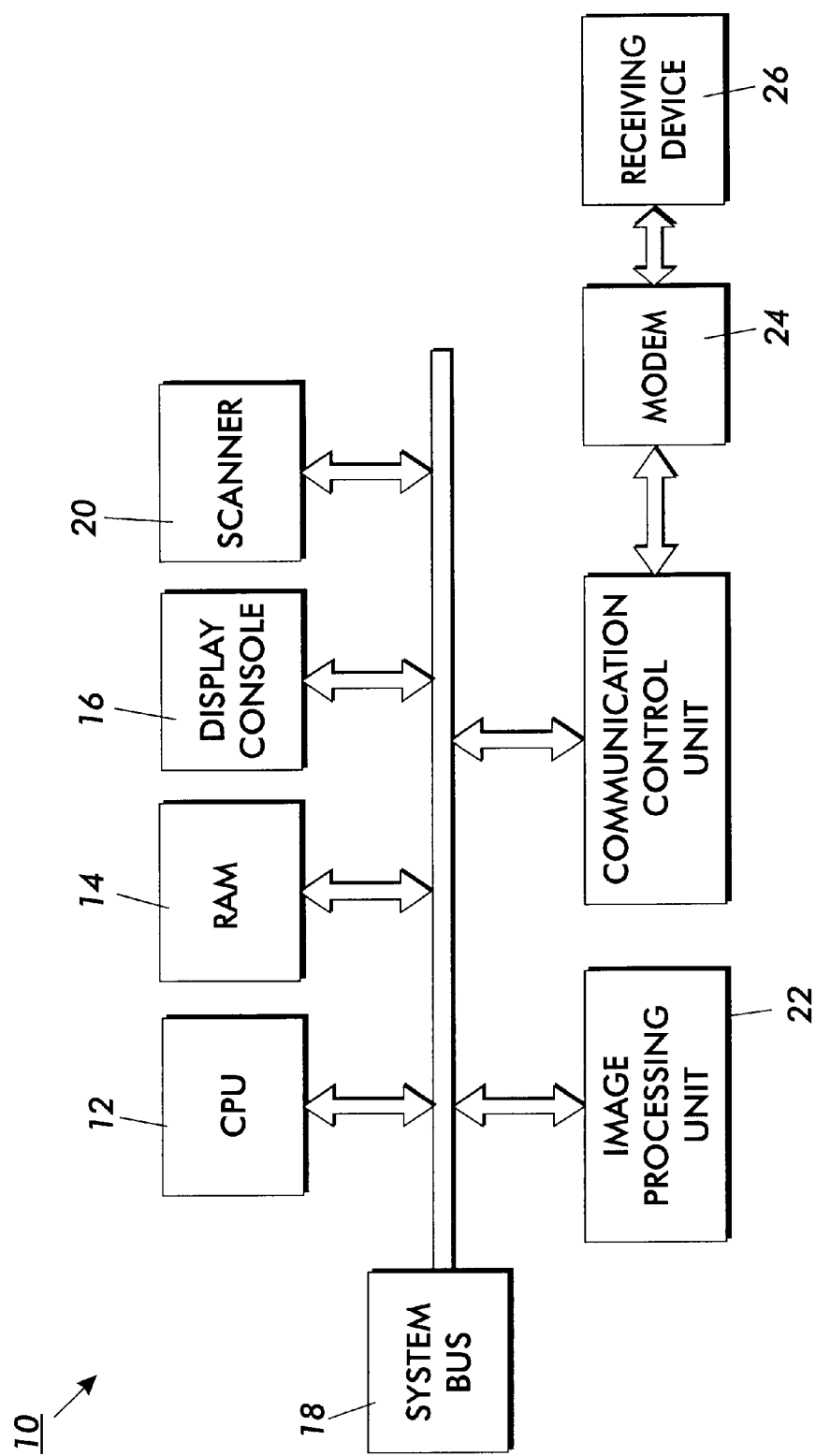
FIG. 1 is a generalized block diagram illustrating general aspects of a facsimile machine that may be used to practice the present invention.

Referring now to the drawings where the showings are for the purpose of describing an embodiment of the invention and not for limiting same, FIG. 1 is a block diagram showing structure of an embodiment of a facsimile (fax) apparatus 10 according to the present invention. Fax 10 includes a CPU 12 for executing controlling processes and facsimile transmission control procedures, a RAM 14 for controlling programs and a display console 16 with various buttons and/or switches for controlling the facsimile apparatus and LCDs or LED's for reviewing the status of system operation. A scanner 20 is also included for acquiring an original image and generating image data therefrom. Image processing unit 22 is included to perform encoding and decoding (compression and decompression) processes between an image-signal and transmitted codes. Significantly for purposes of this invention, fax 10 includes or interfaces with a modem 24, which is a modulating and demodulating device that transmits and receives picture information over telephone lines to a compatible receiving device 26, such as another facsimile machine, a printer, computer terminal or similar apparatus.

Figure 2:
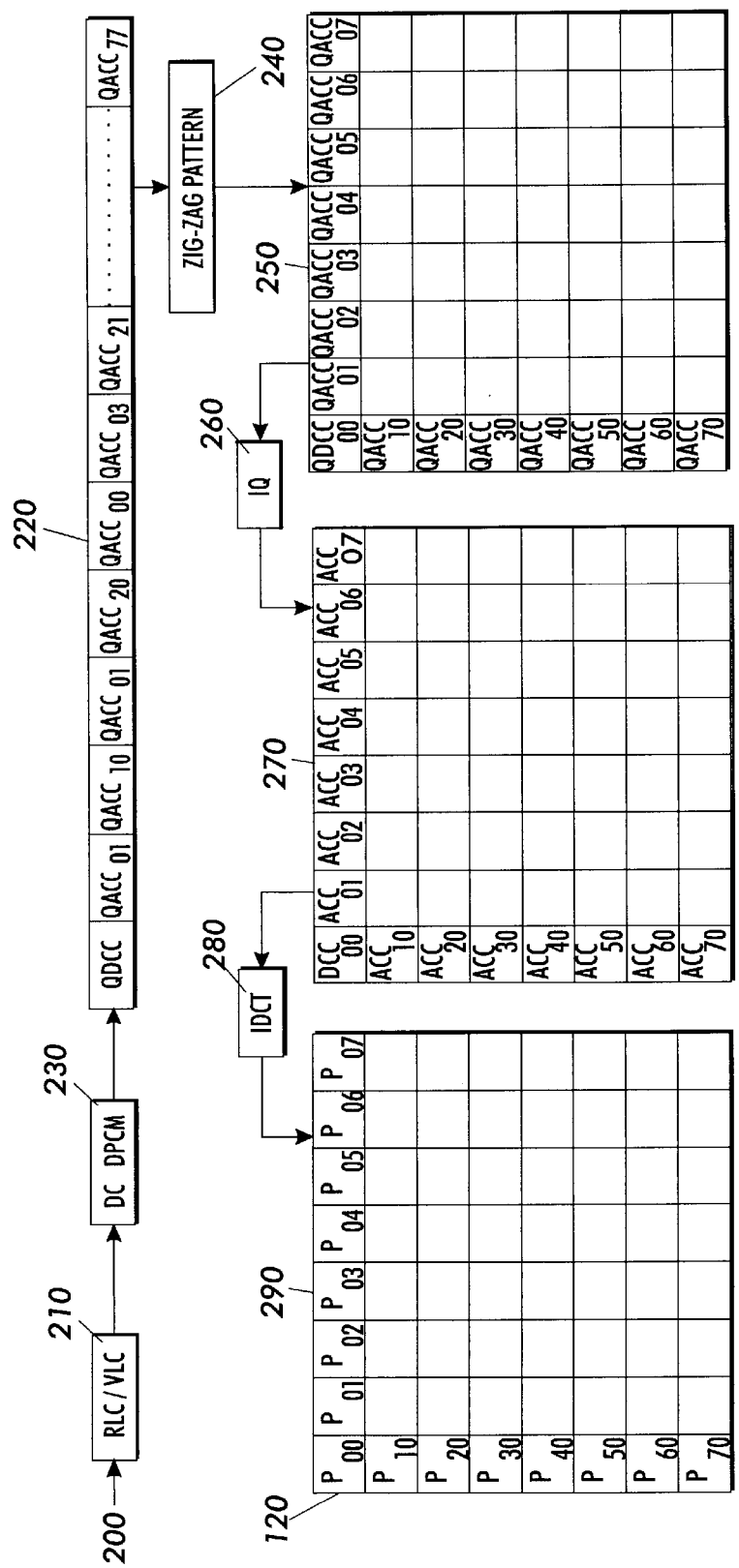
FIG. 2 contains a schematic illustration of the steps used to carry out a JPEG decompression scheme.

As stated above, image processing unit 22 is used to compress and decompress image signals and transmitted codes. One common method of compressing and decompressing image signals is through use of the JPEG (Joint Photographic Experts Group) standard described in detail with regard to decompression in reference to FIG. 2. An encoded compressed data stream 200 is received by fax 10 and provided to image processing unit 22 for generating the corresponding digital image pixel data. The encoded data has in it some number of coefficients. In particular a coefficient with the lowest frequency information is referred to as the DC coefficient (DCC), and the remaining coefficients are AC coefficients (ACCs). As is well understood in the art, first decoding of the Run Length Counting (RLC) operation is performed to determine the data block length. Then Huffman decoding of the Variable Length Codes (VLC) as indicated in block 210 is performed to decode a symbol that includes a combination of the number of zeros preceding a non-zero ACC and the ACC amplitude. In this manner, vector 220 is built up placing the coefficients in the desired order. However, the quantized DCC is typically the first value of the vector 220, and is represented differentially as the actual DCC value minus the DCC of the previous data block. As shown, step 230 DPCM performs the necessary comparison to reconstruct the actual DCC value in the first position of quantized data vector 220. Next the one dimensional vector data 220 is arranged into an 8×8 matrix via a selected pattern (typically a "zigzag") as shown by block 240 to yield the quantized coefficients data matrix 250. Then the DCC and ACCs are inversely quantized—each coefficient is multiplied by a predetermined whole number referred to as the "step size" at step 260. Finally the de-quantized coefficient data matrix 270 gets an 8×8 inverse discrete cosine transform applied at step 280 to yield the 8×8 matrix of pixel data 290. It is in this area of processing, the inverse discrete cosine transform (IDCT), to which the focus of the present invention is mainly directed.

Generally speaking the present invention includes performing a portion of the JPEG decompression method on a reduced set of data, without producing a substantial loss in the quality of the output image. The invention takes advantage of the fact that a 4×4 IDCT can be performed more quickly than a 8×8 IDCT can; that a 2×2 IDCT can be performed faster than a 4×4 IDCT can; and that a 1×1 IDCT can be performed quicker than a 2×2 IDCT can. As is well known in the art, JPEG achieves compression because most DCT coefficients in a block after quantization are zero. The present invention saves time by computing fewer zero coefficients. It is also known that a certain amount of high frequency loss can be tolerated particularly with color separation data or in a fax environment. The invention examines the high band pass information for activity, i.e. coefficients of zero. If an end-of-block zero coefficient is found in the scan early enough, then a smaller block size IDCT is performed. The normal 8×8 IDCT is not performed, instead interpolation of the smaller block size IDCT result is performed to provide a full 8×8 matrix of pixel data. This allows the invention to save computation time.

A preferred embodiment of the invention starts with the normal steps of JPEG decompression followed through to where there is quantized data vector 220. The data vector 220 is scanned through to examine for the maximum index of a non-zero coefficient. In other words, the data values are examined to determine where the end of block command was reached because the remainder of data was all zeros. In a preferred embodiment there are four different paths to be followed depending upon the maximum index result. Those paths consist of taking either a 1×1 or a 2×2 or a 4×4 or the normal 8×8 matrix of data for processing. This may be summarized where k is the block size and k ∈ {1, 2, 4, 8}, and the maximum index of a non-zero coefficient in a vector v(n) is M:

Select k=1 if M=0, else
Select k=2 if M<4 and v(3)=0, else
Select k=4 if M<13 and v(10)=0, else
Select k=8 (the normal JPEG situation).

The above summary will now be explained as follows.

Where k=1 we need only process a 1×1 matrix of data, as the remaining matrix values are all zeros. Referring now to FIG. 3, matrix 300 depicts the situation here. The maximum index for a non-zero coefficient is location 0. The remaining locations 1–63, address zero value coefficients. So we need not scan the rest of the vector 220 into the matrix to be inverse transformed. The DCC coefficient at v(0) [i.e. location 0] is multiplied by the quantizer step. Then because the IDCT of a 1×1 matrix actually remains the same value no processing is required for the IDCT step in this instance. However, we must divide by 8 to allow for the scaling effect of a 1×1 versus an 8×8 IDCT since the data was originally 8×8 DCT when originally compressed. All that remains is to interpolate this resulting pixel value to get a full 8×8 of pixel data. This is done by simply replicating the single average pixel result through-out the block to fill in all of the 8×8 samples.

In our second path where k=2 we have a subset matrix 310 of 2×2 as shown in FIG. 3 in matrix 320. The subset matrix includes locations 0, 1, 2, and 4. This means that the lowest frequency ACC are retained. Except, notice that location 3 is outside the box of our 2×2 subset matrix 310. This means that we need to check location 3 for a zero value before proceeding. If location 3 has a non-zero value, in a preferred embodiment we proceed instead to our third path and apply a 4×4 subset matrix 330. However, if v(3) has a zero value then we may proceed down the second path which is depicted in FIG. 4.

Figure 4:
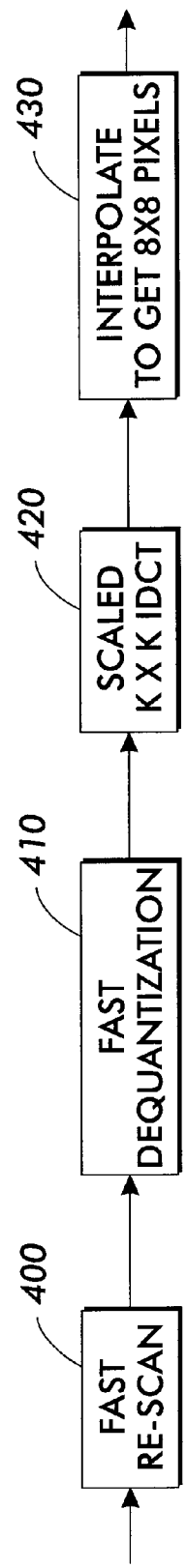
FIG. 4 contains a schematic illustration of one way the present invention may be implemented in a JPEG decompression technique.

Turning now to FIG. 4, a fast rescan 400 step is performed to bring into memory any needed values from vector 220. The four samples are then dequantized at step 410. What follows is a scaled 2×2 IDCT at step 420. Multiplying by 0.25 (i.e. dividing by four) for scaling is needed in this preferred embodiment because the data when originally JPEG compressed received an 8×8 DCT. The scaling compensates for using a 2×2 instead of an 8×8 IDCT. Scaling in general is explained as follows:

Assume the N×N inverse DCT of an N×N array of numbers X is defined as $$IDCT_N(X) = D^T_N X D_N$$

and where the superscript T means matrix transposition and the matrices $D_N$ have entries $$d_{ij} = k_i \cos\left(\frac{2i(2j+1)}{4N}\pi\right)$$

$$k_0 = \frac{1}{\sqrt{N}} \text{ and}$$

$$k_{i>0} = \sqrt{\frac{2}{N}}$$

For a selected K×K array C of lower frequency DCT coefficients, one obtains also a K×K array of pixels which are then interpolated to form the 8×8 block.

K = 1, 1 × 1 case, there is just the DC     Y = C * (⅛)
K = 2, 2 × 2 case     Y = IDCT$_2$(C) * (¼)
K = 4, 4 × 4 case     Y = IDCT$_4$(C) * (½)
K = 8, 8 × 8 case,     Y = IDCT$_8$(C)
prior art used in JPEG, no interpolation necessary For the general case, for N×N final block size (e.g. 8×8 for JPEG)

$$Y = IDCT_K(C) * (K/N)$$

After the data is scaled then an interpolation step 430 is performed. This interpolation allows us to get a full 8×8 block of data. In a preferred embodiment interpolation is performed by using nearest neighbor method (in other words pixel replication) which is well understood by those skilled in the art. With a 2×2 sub block the interpolation involves a step and repeat of the 2×2 data into every other 2×2 sub block in the 8×8 matrix. Since that is four across and four down there are sixteen 2×2 positions to copy the data into to achieve interpolation.

The third path where k=4 we have a subset matrix 330 of 4×4 as shown in FIG. 3 in matrix 340. The subset matrix includes locations 0–9, 11–13, 17, 18, and 24. In this preferred embodiment, this path is only selected if there are no non-zero coefficients beyond location 13, and that location 10 which is outside the subset matrix 330 has a value of zero. Other arrangements are possible if the sacrifice of extra processing time to check more locations or if inaccuracy from not checking is acceptable. If the conditions of no non-zero coefficients beyond v(13) and v(10)=0 cannot be met in this preferred embodiment of the invention then the fourth path of a normal JPEG 8×8 IDCT is performed.

However, if the conditions are met then same procedure is followed with the third path 2×2 example as depicted in FIG. 4. Locations 0 through 13 are quickly rescanned in step 400.

Remember that locations 17, 18, and, 24 in subset matrix 330 are by definition zero values. A dequantization 410 is applied to the subset matrix data, followed by a scaled 4×4 IDCT at step 420. The scaling factor to be applied here is 0.5 as noted and explained above. Interpolation is next performed at step 430. With a 4×4 sub block the interpolation involves a step and repeat of the 4×4 data into every other 4×4 sub block in the 8×8 matrix. Since that is two across and two down, there are four 4×4 positions to copy the data into to achieve interpolation.

Finally, the fourth path is taken if none of the other paths can be taken. The fourth path is a normal standard JPEG decompression with a 8×8 IDCT. Obviously there will be no savings in decompression time in this particular path. However, by taking advantage of the tendency for JPEG compression to create many zero values (so as to get early end of block statements and shorter data streams) it has been experimentally determined that a decoder implementing the above described invention is about twice as fast as a conventional decoder. The improvement in speed comes from the faster inverse transform time as well as the direct consequence of the decompression steps operating upon smaller sets of data.

It is, therefore, apparent that there has been provided in accordance with the present invention a method for fast decompression of JPEG files. While this invention has been described in conjunction with a specific embodiment thereof, it is evident that many alternatives, modifications, and variations will be apparent to those skilled in the art. In particular, as an expedient and as an aid to understanding, this invention has been expressed conceptually utilizing matrixes. It is well understood by those skilled in the art that the actual processing of matrixes in a typical processor may be performed using vectors or many other means. Accordingly, it is intended to embrace all such alternatives, modifications and variations that fall within the spirit and broad scope of the appended claims.

What is claimed is:

1. A method of improving the speed and efficiency of electronic data decompression, comprising:
    retrieving compressed serial data corresponding to a matrix;
    examining the compressed serial data for a zero coefficient position;
    selecting a transform as based upon the zero coefficient position found in the examining step;
    applying the selected transform to a subset of the compressed serial data to produce a subset transform result; and
    interpolating the subset transform result to provide decompressed data.

2. The method of claim 1 wherein the step of applying a transform includes using an inverse discrete cosine transform.

3. The method of claim 1 wherein the step of applying a transform includes using a 1×1 inverse discrete cosine transform.

4. The method of claim 1 wherein the step of applying a transform includes using a 2×2 inverse discrete cosine transform.

5. The method of claim 4 wherein the step of interpolating involves multiplying by a factor of 0.25 for scaling.

6. The method of claim 1 wherein the step of applying a transform includes using a 4×4 inverse discrete cosine transform.

7. The method of claim 6 wherein the step of interpolating involves multiplying by a factor of 0.50 for scaling.

8. The method of claim 1 wherein the step of interpolating involves scaling.

9. A method of improving the speed and efficiency of electronic data decompression, comprising:
    examining compressed serial data for the position of an end-of-block command in the data;
    selecting an inverse transform depending upon the position of an end-of-block command found in the examining step, applying the selected inverse transform to the compressed data to produce a transform result; and
    interpolating the transform result to provide decompressed data.

10. The method of claim 9 wherein the step of examining for particular arrangements of data comprises determining the location of zero values in the compressed serial data.

11. The method of claim 10 wherein the step of applying a transform includes using a 1×1 inverse discrete cosine transform.

12. The method of claim 10 wherein the step of applying a transform includes using a 2×2 inverse discrete cosine transform.

13. The method of claim 10 wherein the step of applying a transform includes using a 4×4 inverse discrete cosine transform.

14. The method of claim 9 wherein the step of examining for particular arrangements of data comprises determining the location of a zero coefficient in the compressed serial data.

15. The method of claim 14 wherein the step of applying a transform includes using a 1×1 inverse discrete cosine transform.

16. The method of claim 14 wherein the step of applying a transform includes using a 2×2 inverse discrete cosine transform.

17. The method of claim 14 wherein the step of applying a transform includes using a 4×4 inverse discrete cosine transform.

18. A method of improving the speed and efficiency of JPEG decompression, comprising:
    examining compressed serial data for a zero coefficient position to determine a determined subset of compressed data;
    selecting an inverse transform depending upon the zero coefficient position found in the examining step;
    applying the selected inverse transform to the determined subset of compressed data to produce a subset transform result; and
    interpolating the subset transform result to provide a full 8×8 matrix of pixel data.

19. The method of claim 18 wherein the step of examining for particular arrangements of data comprises determining the location of zero values in the compressed serial data.

20. The method of claim 19 wherein the step of applying a transform includes using a 1×1 inverse discrete cosine transform.

21. The method of claim 19 wherein the step of applying a transform includes using a 2×2 inverse discrete cosine transform.

22. The method of claim 19 wherein the step of applying a transform includes using a 4×4 inverse discrete cosine transform.

23. The method of claim 18 wherein the step of examining for particular arrangements of data comprises determining the location of a "end of block" in the compressed serial data.

24. The method of claim 23 wherein the step of applying a transform includes using a discrete inverse cosine transform.

25. The method of claim 23 wherein the step of applying a transform includes using a 1×1 inverse discrete cosine transform.

26. The method of claim 23 wherein the step of applying a transform includes using a 2×2 inverse discrete cosine transform.

27. The method of claim 23 wherein the step of applying a transform includes using a 4×4 inverse discrete cosine transform.

* * * * *